United States Patent
Seiden et al.

(10) Patent No.: US 11,281,687 B2
(45) Date of Patent: Mar. 22, 2022

(54) COMPILING A DATABASE QUERY

(71) Applicant: SIGMA COMPUTING, INC., San Francisco, CA (US)

(72) Inventors: Max H. Seiden, San Francisco, CA (US); Jason D. Frantz, San Francisco, CA (US); Donald Huang, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 168 days.

(21) Appl. No.: 16/745,729

(22) Filed: Jan. 17, 2020

(65) Prior Publication Data

US 2021/0224288 A1 Jul. 22, 2021

(51) Int. Cl.
*G06F 17/00* (2019.01)
*G06F 16/25* (2019.01)
*G06F 16/2452* (2019.01)

(52) U.S. Cl.
CPC ...... *G06F 16/254* (2019.01); *G06F 16/24522* (2019.01)

(58) Field of Classification Search
CPC ........ G06F 16/13; G06F 16/24; G06F 16/156; G06F 16/254; G06N 3/00; G06N 5/00; G05B 13/00
See application file for complete search history.

(56) References Cited

U.S. PATENT DOCUMENTS

| | | | |
|---|---|---|---|
| 10,599,627 B2* | 3/2020 | Singh | G06F 16/221 |
| 2004/0103365 A1* | 5/2004 | Cox | G06F 40/18 |
| | | | 715/213 |
| 2004/0103366 A1* | 5/2004 | Peyton-Jones | G06F 40/18 |
| | | | 715/213 |
| 2018/0246915 A1* | 8/2018 | Singh | G06F 16/221 |
| 2018/0276417 A1* | 9/2018 | Cerezo Sanchez | G06F 21/74 |

OTHER PUBLICATIONS

Spreadsheet As a Relational Database Engine, Jerzy Tyszkiewicz. (Year: 2010).*
International Search Report and Written Opinion, PCT/US2020/066667, dated Mar. 24, 2021, 10 pages.
Liu et al.; "A Spreadsheet Algebra for a Direct Data Manipulation Query Interface", IEEE 25th International Conference On Data Engineering (ICDE '09), Mar. 2009, pp. 417-428, IEEE, Piscataway, NJ, USA.

(Continued)

*Primary Examiner* — Hung D Le

(57) ABSTRACT

Compiling a database query including receiving, by a query compiler from a client computing system, a state specification of a graphical user interface comprising a worksheet, wherein the worksheet is a presentation of a data set from a data warehouse; converting, by the query compiler, the state specification into a worksheet algebra including determining a first order of operations for elements within the state specification, wherein the worksheet algebra comprises the first order of operations over a nested table; converting, by the query compiler, the worksheet algebra into a database query; and sending the database query to the data warehouse.

20 Claims, 6 Drawing Sheets

(56) References Cited

OTHER PUBLICATIONS

Murray et al.; "Tableau Your Data! Fast and Easy Visual Analysis with Tableau Software", Chapters 2-4, Jan. 2013, WordPress.com (online), URL: https://tanthiamhuat.files.wordpress.com/2015/07/tableau-your-data.pdf.

Terlecki et al.; "On Improving User Response Times in Tableau", Proceedings of the 2015 ACM SIGMOD International Conference On Management Of Data (SIGMOD '15), [Online], May 2015, pp. 1695-1706, XP055785936, New York, New York, USA DOI: 10.1145/2723372.2742799 ISBN: 978-1-4503-2758-9, URLURL: https://research.tableau.com/sites/default/files/sigmod2015-pawel-tableau90.pdf.

* cited by examiner

COMPILING A DATABASE QUERY

BACKGROUND

Field of the Invention

The field of the invention is data processing, or, more specifically, methods, apparatus, and products for compiling a database query.

Description of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users.

SUMMARY

Methods, systems, and apparatus for compiling a database query. Compiling a database query includes receiving, by a query compiler from a client computing system, a state specification of a graphical user interface comprising a worksheet, wherein the worksheet is a presentation of a data set from a data warehouse; converting, by the query compiler, the state specification into a worksheet algebra including determining a first order of operations for elements within the state specification, wherein the worksheet algebra comprises the first order of operations over a nested table; converting, by the query compiler, the worksheet algebra into a database query; and sending the database query to the data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
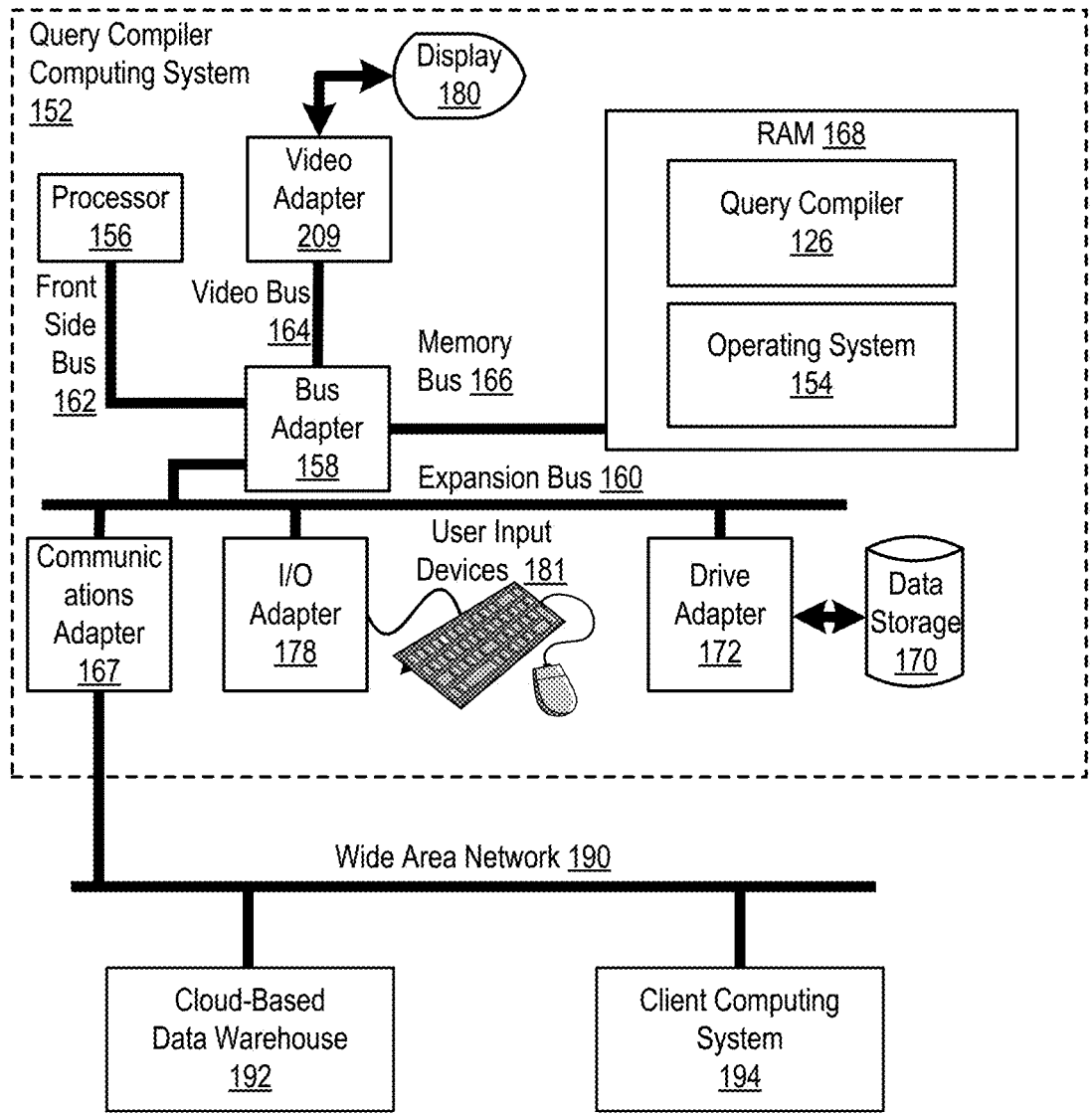
FIG. 1 sets forth a block diagram of an example system configured for compiling a database query according to embodiments of the present invention.

Exemplary methods, apparatus, and products for compiling a database query in accordance with the present invention are described with reference to the accompanying drawings, beginning with FIG. 1. FIG. 1 sets forth a block diagram of automated computing machinery comprising an exemplary query compiler computing system (152) configured for compiling a database query according to embodiments of the present invention. The query compiler computing system (152) of FIG. 1 includes at least one computer processor (156) or 'CPU' as well as random access memory (168) ('RAM') which is connected through a high speed memory bus (166) and bus adapter (158) to processor (156) and to other components of the query compiler computing system (152).

Stored in RAM (168) is an operating system (154). Operating systems useful in computers configured for compiling a database query according to embodiments of the present invention include UNIX™, Linux™, Microsoft Window™, AIX™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the query compiler (126), a module for compiling a database query according to embodiments of the present invention.

The query compiler computing system (152) of FIG. 1 includes disk drive adapter (172) coupled through expansion bus (160) and bus adapter (158) to processor (156) and other components of the query compiler computing system (152). Disk drive adapter (172) connects non-volatile data storage to the query compiler computing system (152) in the form of data storage (170). Disk drive adapters useful in computers configured for compiling a database query according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example query compiler computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example query compiler computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary query compiler computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for compiling a database query according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database or databases for access over the wide area network (190). The client computing system (194) is a computing system that accesses the database using the query compiler (126) on the query compiler computing system (152).

Figure 2:
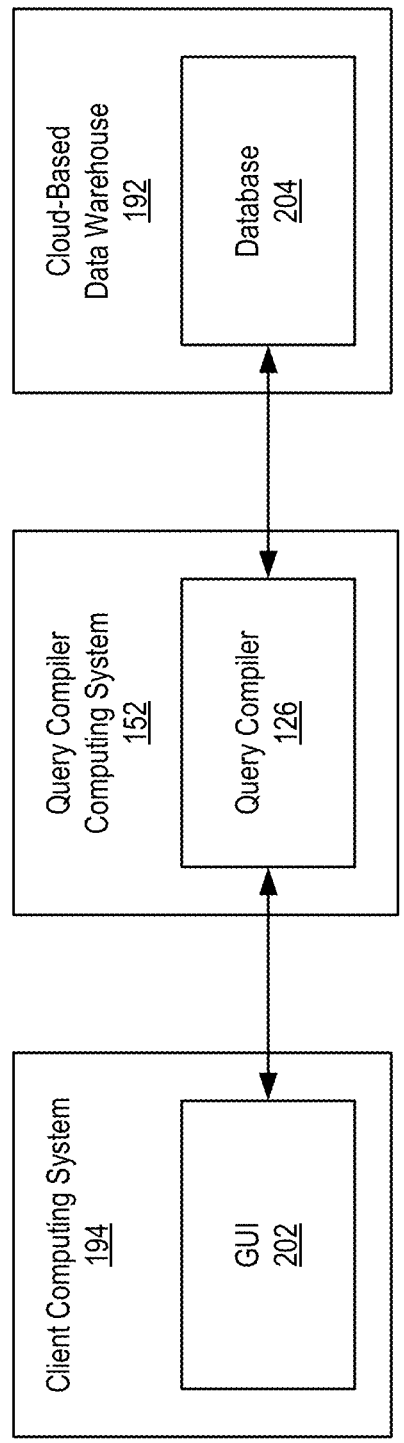
FIG. 2 sets forth a block diagram of an example system configured for compiling a database query according to embodiments of the present invention.

FIG. 2 shows an exemplary system for compiling a database query according to embodiments of the present invention. As shown in FIG. 2, the system includes a client computing system (194), a query compiler computing system (152), and a cloud-based data warehouse (192). The client computing system (194) includes a graphical user interface (GUI) (202). The query compiler computing system (152) includes a query compiler (126). The cloud-based data warehouse (192) includes a database (204).

The GUI (202) is a visual presentation configured to present data sets in the form of worksheets and graphical elements to a user. The GUI (202) also receives requests from a user for data sets from the database (204). The GUI (202) may be presented, in part, by the query compiler (126) and displayed on a client computing system (194) (e.g., on a system display or mobile touchscreen). The GUI (202) may be part of an Internet application that includes the query compiler (126) and is hosted on the query compiler computing system (152).

The database (204) is a collection of data and a management system for the data. A data set is a collection of data (such as a table) from the database (204). Data sets may be generated in response to a database query and provided to the query compiler (126). Data sets may be organized into columns and rows. The particular columns, rows, and organization of the columns and rows that make up a data set may be specified in the database query requesting the data set. A data set, as sent from the database to the query compiler computing system (152) and client computing system (194), may be a portion or subset of a source database table on the database.

The query compiler (126) is hardware, software, or an aggregation of hardware and software configured to receive a state specification from the client computing system (194), via the GUI (202). The query compiler (126) is also configured to generate database queries in response to manipulations of the GUI (202) described in the state specification. The query compiler (126) may be part of a database query generator that generates the database query.

The state specification is a collection of data describing inputs into the GUI (202). The state specification may include manipulations of GUI elements within the GUI (202) along with data entered into the GUI (202) by a user of the client computing system (194). Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet. An exposable parameter is variable within a worksheet function that can be presented and adjusted without presenting, adjusting, or otherwise exposing the worksheet function itself. Security for the worksheet may include hiding portions of the data set that the particular user or a particular group of users is not authorized to view.

The query compiler (126) uses the state specification as input to generate a database query. This transformation process may begin with state specification being converted into an abstract syntax tree. The abstract syntax tree may then be put through the canonicalization process to generate the hierarchy. The hierarchy may then be put through a linearization process to generate the worksheet algebra. The worksheet algebra may then be lowered into the relational algebra, which may then be lowered into the database query.

Figure 3:
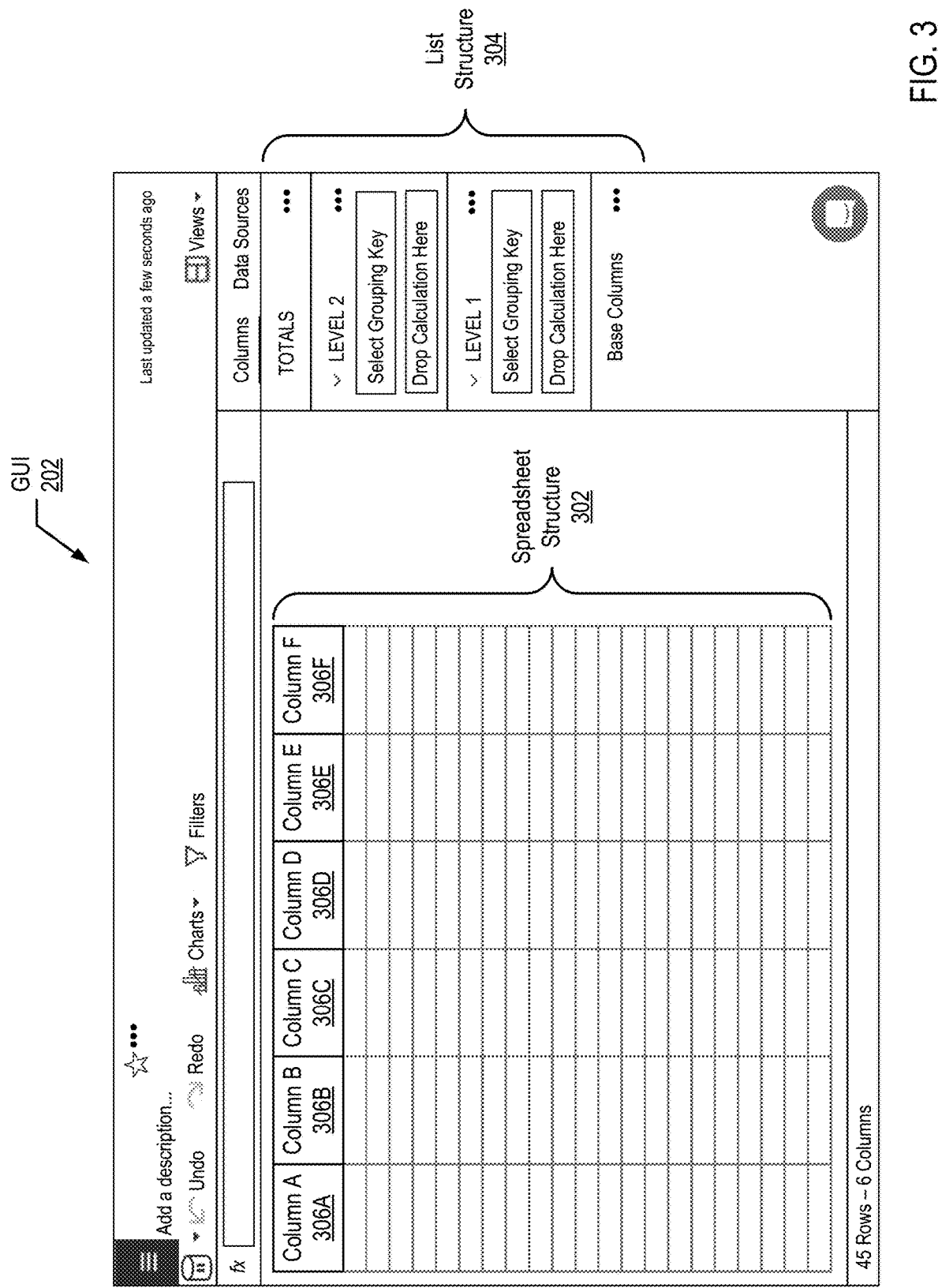
FIG. 3 sets forth a block diagram of an example system configured for compiling a database query according to embodiments of the present invention.

FIG. 3 shows an exemplary system for compiling a database query according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set (such as a table) from a database on a data warehouse. The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request a table from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for a data set and send the request to the query compiler (126). Such a mechanism may also include a direct identification of the rows and columns of a database table that a user would like to access (e.g., via a selection of the rows and columns in a dialog box).

Figure 4:
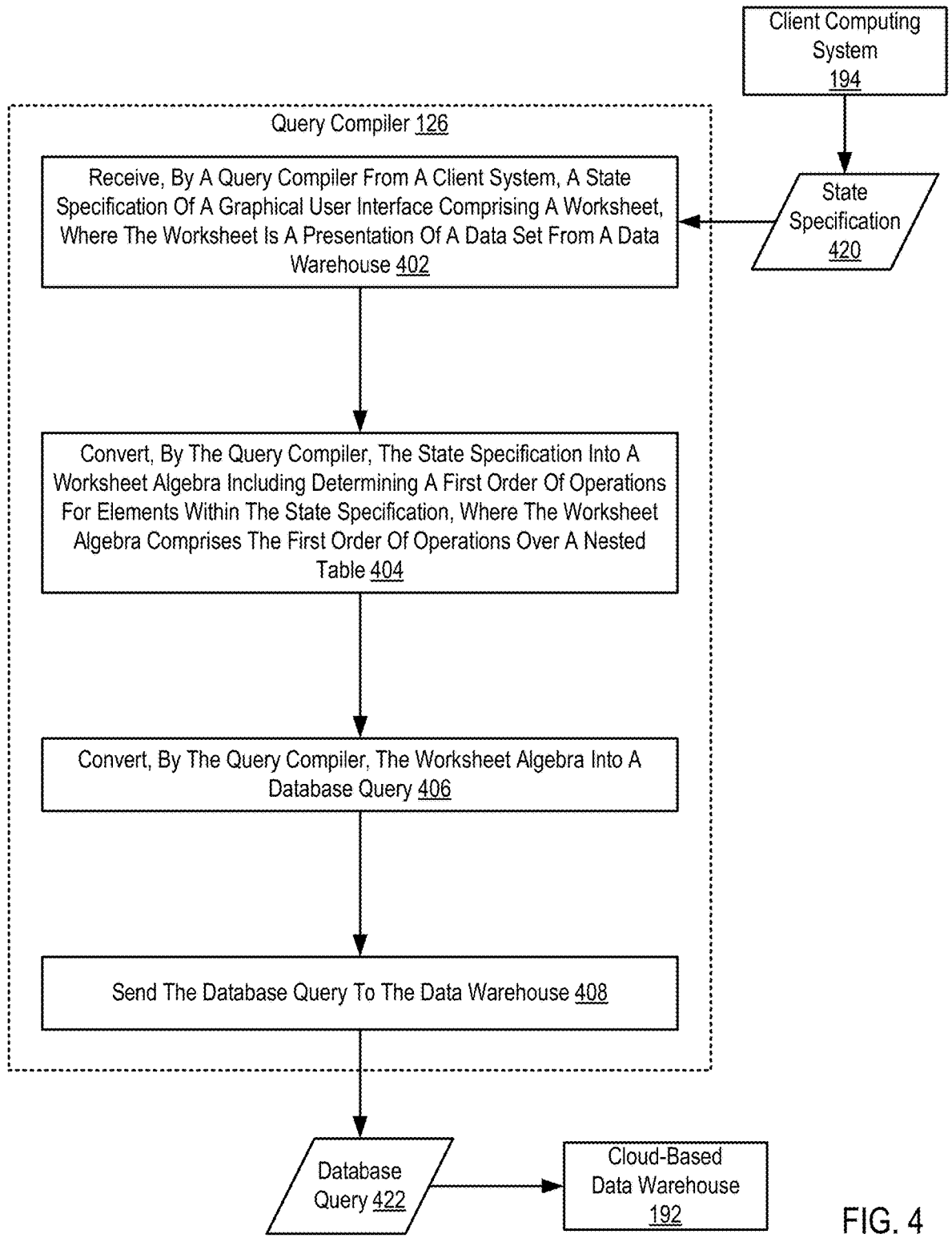
FIG. 4 sets forth a flow chart illustrating an exemplary method for compiling a database query according to embodiments of the present invention.

For further explanation, FIG. 4 sets forth a flow chart illustrating an exemplary method for compiling a database query according to embodiments of the present invention that includes receiving (402), by a query compiler (126) from a client computing system (194), a state specification (420) of a graphical user interface comprising a worksheet, wherein the worksheet is a presentation of a data set from a data warehouse. Receiving (402), by a query compiler (126) from a client computing system (194), a state specification (420) of a graphical user interface comprising a worksheet, wherein the worksheet is a presentation of a data set from a data warehouse may be carried out by detecting that a user has manipulated elements of the GUI and/or submitted data using the GUI such that the generation of a state specification is triggered, and the state specification is sent to the query compiler (126). For example, a user may select a table from a group of tables presented for display in a worksheet on the GUI. As another example, a user may change the order of columns in the dimensional hierarchy of the GUI.

The method of FIG. 4 further includes converting (404), by the query compiler (126), the state specification (420) into a worksheet algebra including determining a first order of operations for elements within the state specification (420), wherein the worksheet algebra comprises the first order of operations over a nested table. As discussed above, the request representation goes through a number of transformations beginning with the state specification (420) and ending with the database query (422). The conversion from the state specification to the worksheet algebra includes a process of linearization into the worksheet algebra. The process of linearization may include determining the order of operations for elements within the state specification (420). Specifically, the state specification (420) may include multiple elements representing alterations (e.g., calculations, formulas, filters, etc.) to be made to the data set. The query compiler (126) determines an order of operations for these elements that preserves the intention of the content of the state specification (420).

The worksheet algebra is used to define queries over tables in a database. The worksheet algebra may efficiently express elements such as filters, aggregations, and references that span the levels of a dimension hierarchy. The worksheet algebra may also efficiently express single-level scalar and window functions. The intermediate representation of the worksheet algebra may then be transformed into the relational algebra.

The worksheet algebra may include various operators. For example, the worksheet algebra may include projection, filter, aggregate reference, and functional reference operators. A projection operator is a unary operator that takes a single level as its input and outputs a new level with additional attributes. The formulas used to compute these new attributes may be simple functions or complex window functions.

A filter operator is a unary operator that takes an entire hierarchy as its input, and outputs a new hierarchy containing a subset of groups and/or rows. The filter predicate resides within a single level of the hierarchy. The effects may be propagated to other levels. For example, if a group is removed from level 2, all groups in level 1 and rows in the base level may also be removed from the hierarchy.

An aggregate reference operator is a binary operator that takes two levels as its input and outputs a new level with additional attributes. The formulas used to compute these new attributes may be aggregation functions like sum or count. The grouping keys for the aggregation are derived from the level's keys, as specified in the hierarchy. As such the level used as the aggregation input may be below the level at which the aggregates are computed.

A functional reference operator is a binary operator that takes two levels as its inputs and outputs a new level with additional attributes. The functional reference operator defines attributes from an upper level that are made available in a lower level, which may be necessary for some calculations as the projection operator may only admit a single level as its input.

The worksheet algebra applies this order of operations to a nested table. Specifically, the data set within the worksheet algebra may be represented by a single nested table. This nested table is a logical representation of the dataset but has no direct bearing on the physical representation in the data warehouse. Although the request representation may include references to multiple database tables, the worksheet algebra represents these multiple database tables as a single table with additional tables nested within the single table.

The worksheet may be considered a unary operator in the relational algebra. The worksheet may have a complex configuration (i.e., the state specification), may be decomposed into simpler relational algebra operators, and may produce a single relation as an output. Because the worksheet is a unary operator, the singular input may be a root operator such as a database table or view or an intermediate operator such as a join, filter, or another worksheet. Therefore, the nested table may be a logical representation with the worksheet as unary operator.

The method of FIG. 4 further includes converting (406), by the query compiler (126), the worksheet algebra into a database query (422). Converting (406), by the query compiler (126), the worksheet algebra into a database query (422) may be carried out by lowering the worksheet algebra to the database query. The lowering process may include converting the worksheet algebra into an intermediate representation, such as the relational algebra. The database query may be a structured query language statement.

The method of FIG. 4 further includes sending (408) the database query (422) to the data warehouse (192). Sending (408) the database query (422) to the data warehouse (192) may be carried out by issuing the database query (422) to a database on the cloud-based data warehouse (192). The database query (422) may be sent by the query compiler (126) or by other elements on the query compiler computing system. Specifically, the query compiler (126) may return the database query (422) to an element on the may be sent by the query compiler (126) or by other elements on the query which, in turn, sends the database query (422) to the data warehouse (192). In response, the cloud-based data warehouse (192) may transmit a new data set to the query compiler computing system for presentation via the GUI on the client computing system (194).

The above steps improve the operation of the computer system by compiling a database query from a human-readable input in the form of a GUI state specification. This is accomplished by generating different intermediate representations of the request to lower the state specification into the database query.

Figure 5:
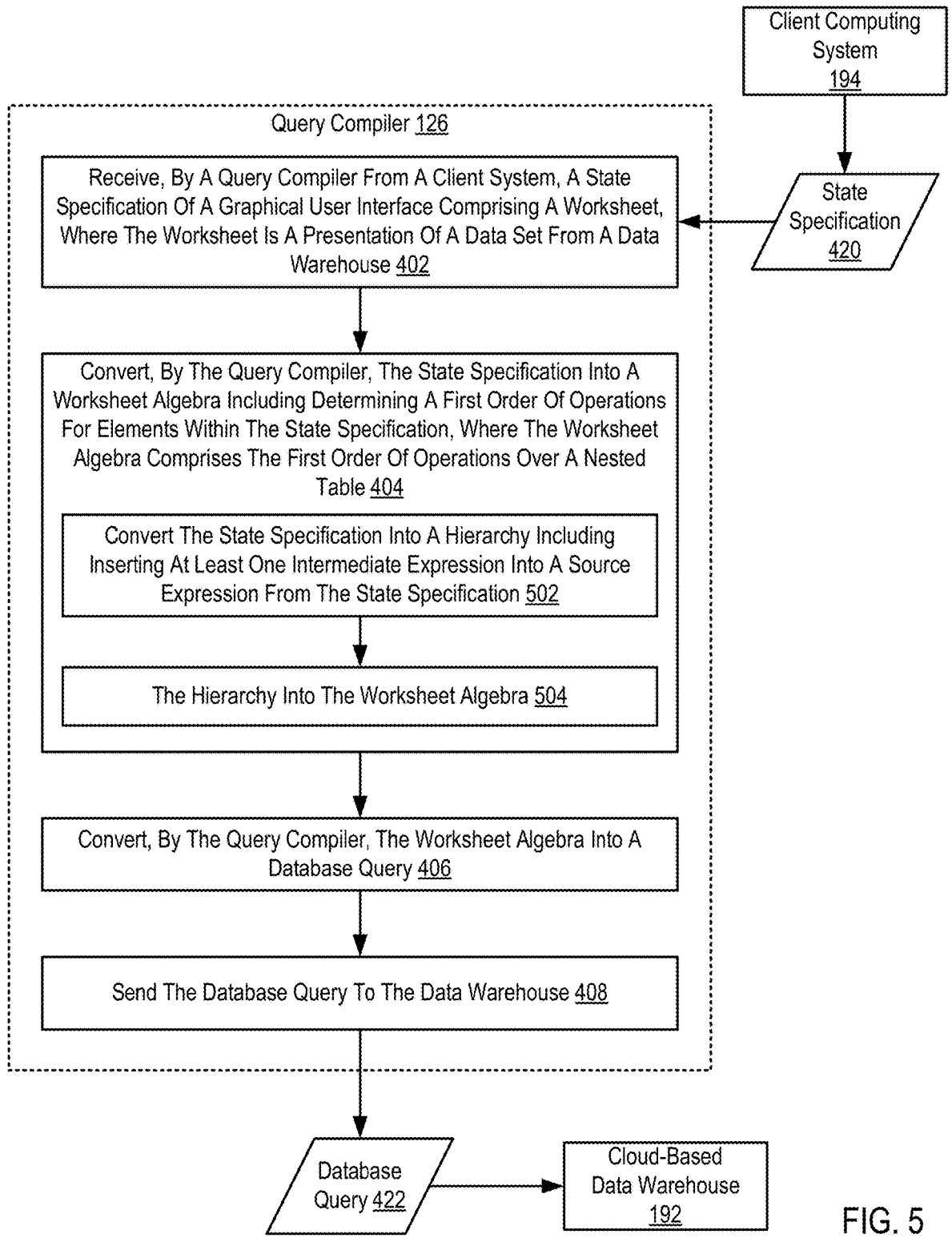
FIG. 5 sets forth a flow chart illustrating an exemplary method for compiling a database query according to embodiments of the present invention.

For further explanation, FIG. 5 sets forth a flow chart illustrating a further exemplary method for compiling a database query according to embodiments of the present invention that includes receiving (402), by a query compiler (126) from a client computing system (194), a state specification (420) of a graphical user interface comprising a worksheet, wherein the worksheet is a presentation of a data set from a data warehouse; converting (404), by the query compiler (126), the state specification (420) into a worksheet algebra including determining a first order of operations for elements within the state specification (420), wherein the worksheet algebra comprises the first order of operations over a nested table; converting (406), by the query compiler (126), the worksheet algebra into a database query (422); and sending (408), by the query compiler (126), the database query (422) to the data warehouse (192).

The method of FIG. 5 differs from the method of FIG. 4, however, in that converting (404), by the query compiler (126), the state specification (420) into a worksheet algebra including determining a first order of operations for elements within the state specification (420), wherein the worksheet algebra comprises the first order of operations over a nested table includes converting (502) the state specification (420) into a hierarchy including inserting at least one intermediate expression into a source expression from the state specification; and converting (504) the hierarchy into the worksheet algebra.

Converting (502) the state specification (420) into a hierarchy including inserting at least one intermediate expression into a source expression from the state specification may be carried out by converting the state specification (42) first into an abstract syntax tree before converting the abstract syntax tree into the hierarchy. The abstract syntax tree is an intermediate representation that transforms the state specification into a syntax structure. The hierarchy is an intermediate representation that addresses the position and placement of elements. The hierarchy may not address issues surrounding the input tables (which are addressed by later intermediate representations).

Converting the abstract syntax tree into the hierarchy through the process of canonicalization includes at least one intermediate expression into a source expression from the state specification. This may include adding the intermediate expression into the hierarchy and rewriting the source (or other intermediate) expressions to reference the newly added expression. An expression is an element within the state specification that takes values as inputs and generates other values as outputs. Expressions, as they exist within the state specification and abstract syntax tree, may not be readily applicable to a data set, such as a table. Such expressions may require adjustment in the form of expansion and insertion of intermediate expressions within the initial expression. Therefore, as part of the canonicalization, an intermediate expression may be inserted into a source expression from the state specification. Converting (504) the hierarchy into the worksheet algebra may be carried out by linearizing the hierarchy, including determining the order of operations for elements within the hierarchy.

Figure 6:
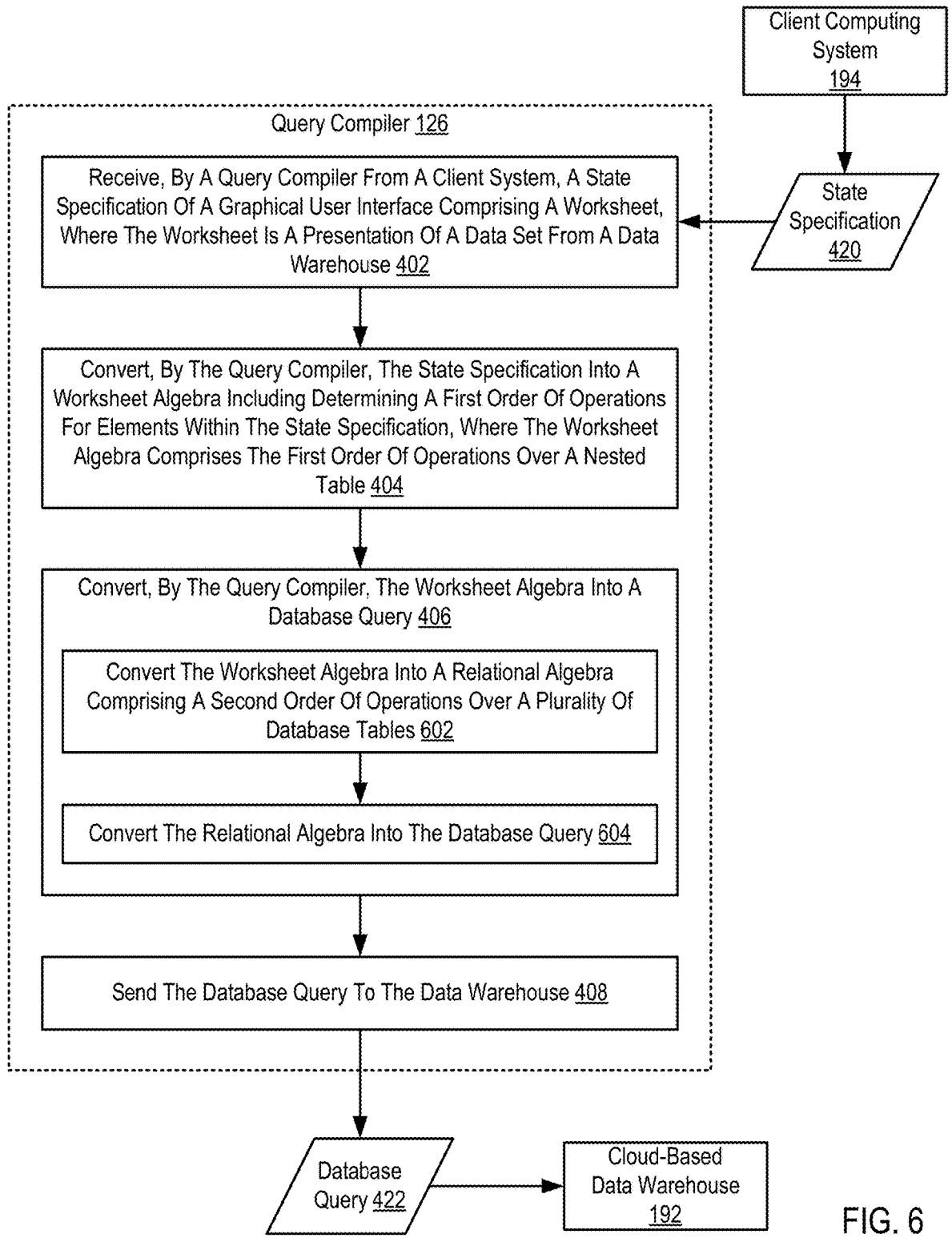
FIG. 6 sets forth a flow chart illustrating an exemplary method for compiling a database query according to embodiments of the present invention.

For further explanation, FIG. 6 sets forth a flow chart illustrating a further exemplary method for compiling a database query according to embodiments of the present invention that includes receiving (402), by a query compiler (126) from a client computing system (194), a state specification (420) of a graphical user interface comprising a worksheet, wherein the worksheet is a presentation of a data set from a data warehouse; converting (404), by the query compiler (126), the state specification (420) into a worksheet algebra including determining a first order of operations for elements within the state specification (420), wherein the worksheet algebra comprises the first order of operations over a nested table; converting (406), by the query compiler (126), the worksheet algebra into a database query (422); and sending (408), by the query compiler (126), the database query (422) to the data warehouse (192).

The method of FIG. 6 differs from the method of FIG. 4, however, in that converting (406), by the query compiler (126), the worksheet algebra into a database query (422) includes converting (602) the worksheet algebra into a relational algebra comprising a second order of operations over a plurality of database tables; and converting (604) the relational algebra into the database query (422).

Converting (602) the worksheet algebra into a relational algebra comprising a second order of operations over a plurality of database tables may be carried out by lowering the worksheet algebra to generate the relational algebra. The worksheet algebra may be a logical representation of the operations as applied to the data set as a single nested table. In contrast, the relational algebra may be a definite representation of the operations as applied to the data set as separate tables from the database. Each table in the relational algebra may be distinct tables and may be non-nested. Converting (604) the relational algebra into the database query (422) may be carried out by lowering the relational algebra into the syntax of the database query (422) interpretable by the could-based data warehouse (192).

In view of the explanations set forth above, readers will recognize that the benefits of compiling a database query according to embodiments of the present invention include:
  Improving the operation of a computing system by compiling a database query from a human-readable input in the form of a GUI state specification, increasing computing system functionality.
  Improving the operation of a computing system by generating different intermediate representations of the database request to lower a state specification into the database query, increasing computing system robustness and resilience to failure.

Exemplary embodiments of the present invention are described largely in the context of a fully functional computer system for compiling a database query. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiling a database query, the method comprising:
receiving, by a query compiler from a client computing system, a state specification of a graphical user interface comprising a worksheet, wherein the worksheet is a presentation of a data set from a data warehouse;
converting, by the query compiler, the state specification into a worksheet algebra including determining a first order of operations for elements within the state specification, wherein the worksheet algebra comprises the first order of operations over a nested table;
converting, by the query compiler, the worksheet algebra into the database query; and
sending the database query to the data warehouse.

2. The method of claim 1, wherein converting, by the query compiler, the state specification into the worksheet algebra comprises:
converting the state specification into a hierarchy including inserting at least one intermediate expression into a source expression from the state specification; and
converting the hierarchy into the worksheet algebra.

3. The method of claim 1, wherein converting, by the query compiler, the worksheet algebra into the database query comprises:
converting the worksheet algebra into a relational algebra comprising a second order of operations over a plurality of database tables; and
converting the relational algebra into the database query.

4. The method of claim 3, wherein the nested table of the worksheet algebra is a single nested table, and wherein the plurality of database tables of the relational algebra are distinct tables.

5. The method of claim 1, wherein the state specification comprises a description of at least one selected from a group consisting of a filter in the worksheet, a level of the worksheet, a column of the worksheet, a join within the worksheet, an exposable parameter in the worksheet, and security for the worksheet.

6. The method of claim 1, wherein converting, by the query compiler, the state specification into the worksheet algebra comprises converting the state specification into an abstract syntax tree.

7. The method of claim 1, wherein the database query is a structured query language statement.

8. An apparatus for compiling a database query, the apparatus comprising a computer processor, a computer memory operatively coupled to the computer processor, the computer memory having disposed within it computer program instructions that, when executed by the computer processor, cause the apparatus to carry out the steps of:
receiving, from a client computing system, a state specification of a graphical user interface comprising a worksheet, wherein the worksheet is a presentation of a data set from a data warehouse;
converting the state specification into a worksheet algebra including determining a first order of operations for elements within the state specification, wherein the worksheet algebra comprises the first order of operations over a nested table;
converting the worksheet algebra into the database query; and
sending the database query to the data warehouse.

9. The apparatus of claim 8, wherein converting the state specification into the worksheet algebra comprises:
converting the state specification into a hierarchy including inserting at least one intermediate expression into a source expression from the state specification; and
converting the hierarchy into the worksheet algebra.

10. The apparatus of claim 8, wherein converting the worksheet algebra into the database query comprises:
converting the worksheet algebra into a relational algebra comprising a second order of operations over a plurality of database tables; and
converting the relational algebra into the database query.

11. The apparatus of claim 10, wherein the nested table of the worksheet algebra is a single nested table, and wherein the plurality of database tables of the relational algebra are distinct tables.

12. The apparatus of claim 8, wherein the state specification comprises a description of at least one selected from a group consisting of a filter in the worksheet, a level of the worksheet, a column of the worksheet, a join within the worksheet, an exposable parameter in the worksheet, and security for the worksheet.

13. The apparatus of claim 8, wherein converting the state specification into the worksheet algebra comprises converting the state specification into an abstract syntax tree.

14. The apparatus of claim 8, wherein the database query is a structured query language statement.

15. A computer program product for compiling a database query, the computer program product disposed upon a computer readable medium, the computer program product comprising computer program instructions that, when executed, cause a computer to carry out the steps of:
receiving, from a client computing system, a state specification of a graphical user interface comprising a worksheet, wherein the worksheet is a presentation of a data set from a data warehouse;
converting the state specification into a worksheet algebra including determining a first order of operations for elements within the state specification, wherein the worksheet algebra comprises the first order of operations over a nested table;
converting the worksheet algebra into the database query; and
sending the database query to the data warehouse.

16. The computer program product of claim 15, wherein converting the state specification into the worksheet algebra comprises:
converting the state specification into a hierarchy including inserting at least one intermediate expression into a source expression from the state specification; and
converting the hierarchy into the worksheet algebra.

17. The computer program product of claim 15, wherein converting the worksheet algebra into the database query comprises:
converting the worksheet algebra into a relational algebra comprising a second order of operations over a plurality of database tables; and
converting the relational algebra into the database query.

18. The computer program product of claim 17, wherein the nested table of the worksheet algebra is a single nested table, and wherein the plurality of database tables of the relational algebra are distinct tables.

19. The computer program product of claim 15, wherein the state specification comprises a description of at least one selected from a group consisting of a filter in the worksheet, a level of the worksheet, a column of the worksheet, a join within the worksheet, an exposable parameter in the worksheet, and security for the worksheet.

20. The computer program product of claim 15, wherein converting the state specification into the worksheet algebra comprises converting the state specification into an abstract syntax tree.

\* \* \* \* \*